(12) United States Patent
Leshets et al.

(10) Patent No.: US 8,452,311 B1
(45) Date of Patent: May 28, 2013

(54) SLEEP ESTIMATOR FOR CELLULAR TELEPHONES

(75) Inventors: Yona Leshets, Zur-Igal (IL); Daniel Ben-Ari, Moshav Zur Natan (IL); Paul Spencer, Modi'in (IL)

(73) Assignee: Marvell International Ltd., Hamilton (BM)

(*) Notice: Subject to any disclaimer, the term of this patent is extended or adjusted under 35 U.S.C. 154(b) by 633 days.

(21) Appl. No.: 12/579,260

(22) Filed: Oct. 14, 2009

Related U.S. Application Data

(60) Provisional application No. 61/141,367, filed on Dec. 30, 2008.

(51) Int. Cl.
*H04W 68/00* (2009.01)
*G08C 17/00* (2006.01)
*H04B 7/204* (2006.01)

(52) U.S. Cl.
USPC .......................... 455/458; 370/311; 370/318

(58) Field of Classification Search
USPC .... 455/574, 458, 243.1–343.5, 418; 370/311, 370/318; 709/232
See application file for complete search history.

(56) References Cited

U.S. PATENT DOCUMENTS

| | | | |
|---|---|---|---|
| 6,289,227 B1* | 9/2001 | Shi | 455/574 |
| 2003/0117968 A1* | 6/2003 | Motegi et al. | 370/311 |
| 2005/0153714 A1* | 7/2005 | Subrahmanya | 455/458 |
| 2006/0085552 A1* | 4/2006 | Sollenberger et al. | 709/232 |
| 2011/0195697 A1* | 8/2011 | Kim et al. | 455/418 |

* cited by examiner

*Primary Examiner* — Kent Chang
*Assistant Examiner* — Kuo Woo

(57) ABSTRACT

A method for waking up user equipment in a cellular network includes waking up a receiver module at a predetermined wakeup time to receive a transmitted paging signal, when awake, determining prevailing conditions for receiving paging signals, and skipping at least a next possible wakeup time if at least one of the prevailing conditions exceeds an associated threshold level. A user equipment for use on a mobile communications network includes a reception quality determiner to determine at least one of a reception quality of a received signal and a radio frequency (RF) level of the signal, a paging indication processor to process received paging signals, a system message handler to determine a level of activity for a cellular network, and a conditional wakeup mechanism that is configured to set a next wakeup for the user equipment time responsively to an input from at least one of the reception quality determiner and the system message handler.

10 Claims, 2 Drawing Sheets

SLEEP ESTIMATOR FOR CELLULAR TELEPHONES

CROSS-REFERENCE TO RELATED APPLICATIONS

This application claims benefit from U.S. Provisional Patent Application No. 61/141,367, filed Dec. 30, 2008, which is hereby incorporated in its entirety by reference.

FIELD

The present invention relates to wireless communication generally and to low power operation of wireless user equipment in particular.

BACKGROUND

Cellular systems typically employ paging and/or control channels over which a base station may periodically communicate various information to the user equipment (UE) or mobile units, even when the user equipment is in an idle mode (i.e. not currently engaged in a call). For example, a base station may transmit paging indication signals at regular intervals and the user equipment must be configured to receive and analyze these signals in order to receive an incoming call when required.

In order to conserve energy and lengthen battery life, user equipment may be set to enter an idle, or standby, mode when not actively engaged in a call. During standby operation, the user equipment may generally be off, but must partially "wakeup" in time to receive and then analyze paging indication signals. During the wakeup period, various other signals may also be received and analyzed. The analysis may involve, for instance, decoding the paging indication signal from a serving cell and performing measurements on signals transmitted by the serving cell or by neighbor cells, as required, for example, in order for the network to make handoff, or UE to make cell reselection, decisions. The UE will be in deep sleep for the rest of the time.

The power consumption of the user equipment (UE) while in standby mode may be optimized by efficiently monitoring the paging channel. The periodicity and/or duration of wakeup to receive paging information, as well as optimization of power consumption during the wakeup periods, can significantly impact UE performance.

Network configuration, for instance, may impact UE power consumption and performance. Networks may adjust the intervals at which paging signals may be transmitted, which may necessitate a matching adjustment of UE wakeup intervals. This effectively trades off system performance against UE power consumption. In GSM networks for example, paging intervals are measured in terms of MultiFRaMes (MFRM). A MFRM lasts approximately 235 msec. Paging intervals for telephony may typically range between MFRM2 (470 msec) and MFRM9 (2.1 sec). Longer intervals may result in improved UE standby power performance. However the reduced power consumption may result in reduced UE performance (e.g. longer time to identify an incoming call); notably, when paging intervals are missed, as may occur in poor reception conditions or when the network is heavily loaded, further performance degradation, e.g. missed calls, may be experienced. Consequently, in many networks shorter intervals between paging indication signals (thus higher standby power consumption), such as MFRM2/4, and repetitive transmission of paging indication signals have been given preference in an effort to improve system service.

SUMMARY

There is provided, in accordance with an embodiment, a method for waking up user equipment in a cellular network, including waking up a receiver module at a predetermined wakeup time to receive a transmitted paging signal, when awake, determining prevailing conditions for receiving paging signals, and skipping at least a next possible wakeup time if at least one of the prevailing conditions exceeds an associated threshold level.

Further, in accordance with an embodiment, determining the prevailing conditions includes at least one of determining reception quality of received signals, determining radio frequency (RF) level, and determining network activity.

Moreover, in accordance with an embodiment, the skipping includes skipping more than one wakeup time.

Additionally, in accordance with an embodiment, determining network activity comprises determining a level of paging activity.

Further, in accordance with an embodiment, the method also includes performing while awake at least some neighbor cell measurements that were to be performed during a skipped wakeup time period so as to maintain a target number of neighbor cell measurements.

There is also provided, in accordance with an embodiment, a user equipment for use on a mobile communications network, including a reception quality determiner to determine at least one of a reception quality of a received signal and a radio frequency (RF) level of the signal, a paging indication processor to process received paging signals, a system message handler to determine a level of activity for a cellular network, and a conditional wakeup mechanism configured to set a next wakeup for the user equipment time responsively to an input from at least one of the reception quality determiner and the system message handler.

Further, in accordance with an embodiment, the conditional wakeup mechanism is configured to cause the UE to periodically skip waking up for at least one or more possible wakeup time.

Still further, in accordance with an embodiment, the system message handler comprises a paging activity determiner to determine a level of paging activity.

Additionally, in accordance with an embodiment, the paging indication processor also includes a neighbor cell measurer to make neighbor cell measurements and to maintain an average number of the neighbor cell measurements when skipping possible wakeup times.

BRIEF DESCRIPTION OF THE DRAWINGS

The present invention, both as to organization and method of operation, may be more fully understood with reference to the following detailed description of the embodiments when read together with the accompanying drawings, in which.

Figure 1:
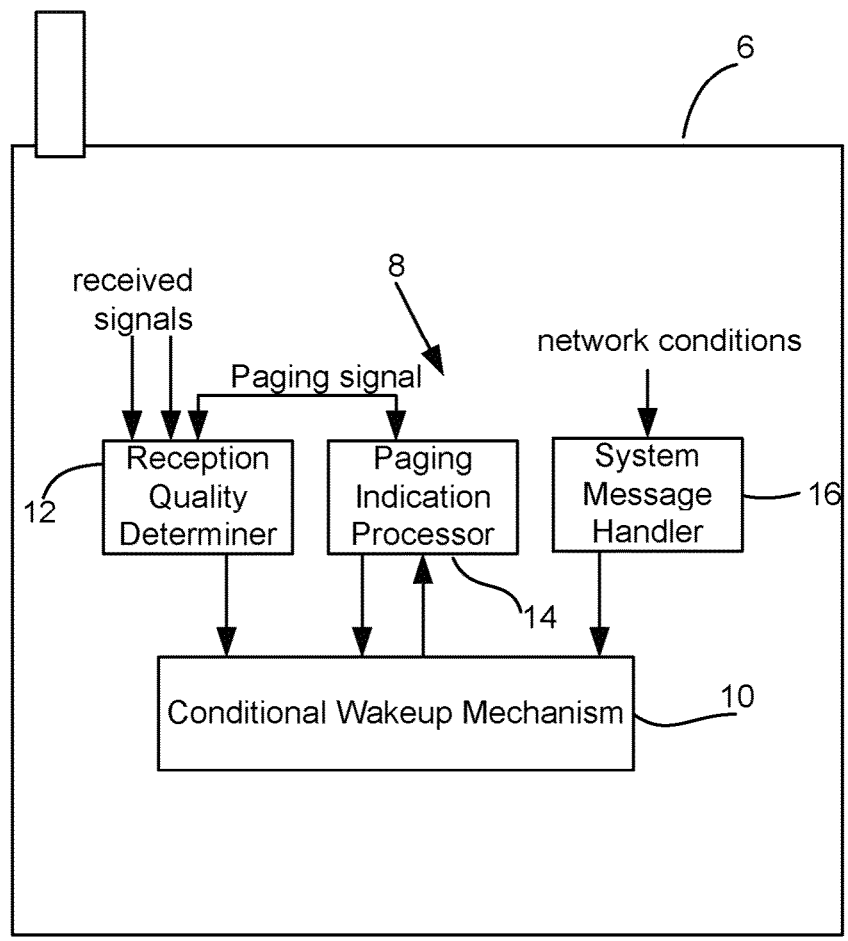
FIG. 1 is a schematic illustration of a novel user equipment, constructed and operative in accordance with an embodiment.

It is noted that where considered appropriate, reference numerals are repeated among the figures to indicate corresponding or analogous elements.

DETAILED DESCRIPTION

Reference is now made to FIG. 1, which illustrates a user equipment (UE) device 6 that is operative on a cellular telecommunications network. UE 6 may include a sleep estimator 8, which is configured to increase the battery life of the user equipment 6. For brevity and in order to avoid obfuscating teachings of the present disclosure, various other elements typically found in a UE are omitted from this description. Although specifically described in the context of Global System for Mobile communications (GSM), analogous principles may be adapted to other suitable wireless and cellular communication standards including, for example, without limitation, Wideband CDMA, LTE, LTE-A and the like.

In accordance with an embodiment, estimator 8 may determine a next wakeup time for UE 6 in an adaptive manner in response to a reception quality of received signals and/or network conditions.

A cellular network may be designed so that a given base station may accommodate user equipment that can be located anywhere within a designated paging area served by the given base station. As such, the base station may be designed to handle the more demanding conditions in which user equipment may operate, such as high mobility within a cell or between cells, and location of the UE at or near cell boundaries. In various extreme conditions, user equipment may be unable to suitably process a given paging indication signal. Therefore, if only a single paging indication signal were to be transmitted, a UE may fail to wake up from an idle mode to receive an incoming call. Consequently, networks may be configured to transmit redundant paging indication signals at successive paging indication slots, thereby increasing the probability that a UE can adequately receive at least one of the paging indication signals.

However, the prevailing connectivity conditions for a significant portion of the daily operation of most UEs are typically much better than in such extreme conditions. Sleep estimator 8 may be configured to take advantage of this fact to further save power for UE 6 by adapting the length of an interval for wakeup to check paging indication signals in response to reception quality and/or network conditions.

In accordance with an embodiment, sleep estimator 8 comprises a conditional wakeup mechanism 10 which may receive data from a reception quality determiner 12, a paging indication processor 14 and a system message handler 16. As will be discussed hereinbelow, reception quality determiner 12 may determine reception quality in the general area of UE 6; paging indication processor 14 may process paging indication signals; and system message handler 16 may monitor paging activity on the network.

Conditional wakeup mechanism 10 may change the wakeup schedule of UE 6 in response to a reception condition and/or a network load. Thus, for example, when reception quality is high and steady (e.g. as measured by reception quality determiner 12) and/or if there is relatively low paging activity on the network (e.g. as determined by system message handler 16 which decodes and handles system messages), such as may occur at certain times in the day (e.g. night time) or in rural areas, or for any other reason, then the interval between wakeup from idle mode may be increased.

For instance, conditional wake up mechanism 10 may instruct UE 6 not to wake up at every time slot, also referred to as a paging slot, in which a paging indication signal may be transmitted. Instead, mechanism 10 may instruct UE 6 to remain in idle mode for one or more time slots during which a paging indication signal may be transmitted. It is noted that in such a case, some paging indication signals, including paging indication signals intended for UE 6, may not be received because UE 6 may not wake up to receive them.

It is noted that determinations as to reception quality may be made in accordance with the applicable standard in accordance with which a UE is operating. For instance, in accordance with GSM standards, reception quality determiner 12 may determine reception quality based on an error rate in received paging signals (including both those that may be directed to the current UE and/or those that may be directed to other UEs) from a serving base station. Other signals and measures of reception quality, whether based on paging indication signals or on other messages or symbols, depending on the applicable standard, may also be suitable for determining reception quality.

Some networks may be configured to use relatively small intervals between slots for sending paging indication signals during busy hours and relatively larger intervals for sending paging intervals during off peak hours, or vice versa. In accordance with an embodiment, UE 6 may be instructed to further lengthen the standby period between wake up periods during which paging indication signals may be received and analyzed, based on reception quality and/or network conditions. In other words, conditional wakeup mechanism 10 may increase the sleep time of UE 6 whenever the reception conditions and/or network conditions enable it to do so, by skipping at least one paging slot for the next scheduled wakeup time. It is noted that when one or more wakeup time slots are skipped, it may be necessary to conduct additional measurements while UE 6 is awake in order to maintain an average rate for neighbor cell measurements. Such measurements may be required by relevant standards or network requirements, e.g. for determining whether to hand off a UE from one cell to another.

Figure 2:
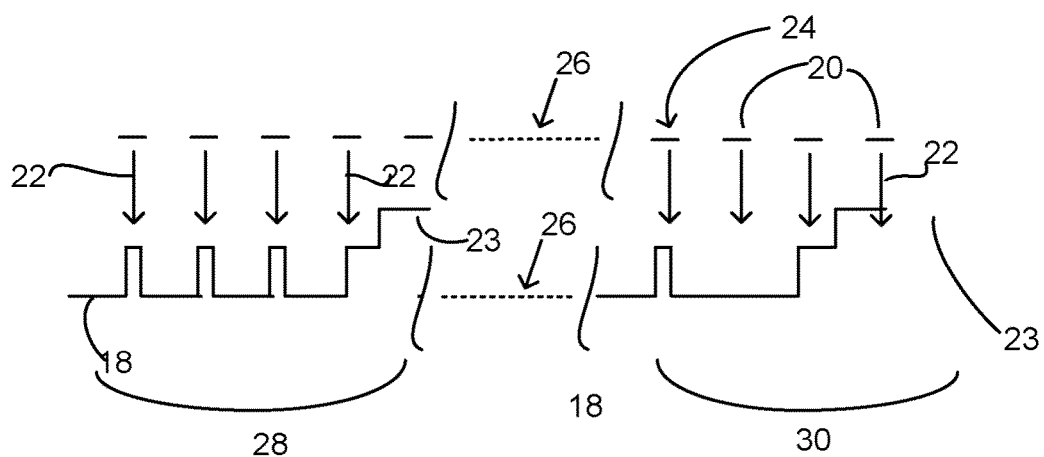
FIG. 2 is a schematic illustration of a timing diagram of active time and sleep time of the user equipment of FIG. 1, constructed and operative in accordance with an embodiment.

Reference is now briefly made to FIG. 2, which is a timing diagram of the active and sleep time of user equipment 6, constructed and operative in accordance with an embodiment. In FIG. 2, dashes 20 indicate paging slots according to a default timing schedule during which the network transmits paging signals to one or more of the UEs that it serves. At a paging slot corresponding to a default timing schedule, a UE may be expected to wake up, check for incoming calls and perform other functions such as performing measurements on incoming signals. Dotted lines 26 represent a period of continuation of the timing diagram without change.

Arrows 22 indicate paging messages, referred to as paging indication signals, that are sent to a given UE 6. At any periodic time slot indicated by dashes 20, paging indication signals may be sent to a current given UE 6, or to any other UE that is served by a base station. As seen in FIG. 2, four paging indication signals that are directed to a given UE 6 are shown for each of call events 28 and 30. UE 6 may need to sufficiently wake up during each time slot 20 to receive one or more of signals 22, and then fully wake up to receive an incoming call where required. It is noted that paging signals 22 sent to other UEs (not shown) may also be received at UE 6; however, UE 6 should not wake up fully to receive a call in response to these other signals. Each of the paging indication signals 22 is transmitted during a paging slot 20. It is noted that this is an example only and that the network may be configured to transmit a lesser or greater quantity of paging indication signals 22 during successive slots 20.

Curve 18 of FIG. 2 corresponds to the activity of conditional wakeup mechanism 10, where the lower level of curve 18 indicates a low power operation ("standby" or "idle" mode). The middle level indicates wakeup activity during which UE 6 wakes up to check whether it has received a paging indication signal 22 and performs other activities such as, for example, performing measurements to ascertain reception quality on received signals. A higher power level 23 indicates that UE 6 has entered into a call mode during which it engages in a received call.

In the example seen, user equipment 6 initially partially wakes up during each slot in which a paging indication signal may be transmitted. While partially awake, UE 6 may perform various measurements on received signals to ascertain a quality of reception of signals received from the serving base station, and may perform measurements on other received signals as required by relevant communication standards and network protocols. Additionally, while awake, conditional wakeup mechanism 10 may receive additional information about network load and other network system information that may be relied up to decide whether to continue waking up at every slot 20, or rather to skip at least some slots 20.

As seen in FIG. 2, a paging indication signal 22 signaling that UE 6 is to receive an incoming call may be transmitted in four successive time slots 20. Consequently, if UE wakes up during each slot 20, it may receive one of the transmitted paging indication signals 22 at any one of the four slots in which a signal 22 may have been sent.

Conditional wakeup mechanism 10 may periodically determine that reception conditions are sufficiently good and/or that network conditions are such that wake up for one or more paging slots 20 may be skipped. An example of the results of such a determination may be seen after the paging slot 20 indicated by arrow 24. In other words, after such determination UE 6 may remain in idle mode during selected paging slots 20. Consequently, in the period following arrow 24, even though UE 6 may remain in standby mode during one or more paging slots 20, because of favorable reception conditions and/or other suitable network conditions UE 6 is able to nevertheless receive at least one of the paging indication signals 22 despite having skipped wakeup at some of slots 20. It is noted that the timing diagram shown in FIG. 2 is only one example of many possible timing diagrams. In actual operation, more or less time may pass between changes of wakeup strategy as determined by conditional wakeup mechanism 10.

It is noted that conditional wakeup mechanism 10 may be configured to skip one, two, or more paging slots 20, depending on the quality of reception and the volume of network activity. Similarly, conditional wakeup mechanism 10 may be responsive to network level changes relating to the periodicity at which paging signals 22 are sent. For example, at times when network volume is reduced, or in locations where network volume is low, conditional wakeup mechanism 10 may be configured to avoid skipping slots 20, or vice versa. In such cases, as long as reception is relatively good, it may be possible to remain in standby during some of paging slots 20, and still have sufficient opportunity to receive one or more paging signals 22. For these purposes, good reception may be defined, for example, as exceeding a threshold measure for a reception quality such as BER, BLER, RSSI, RSRP and the like. Conditional wakeup mechanism 10 may be thus configured to cause UE 6 to skip waking up for one out of every two paging slots 20, to skip waking up for one out of every three paging slots 20, to skip waking up for two out of every three paging slots 20 or for any other suitable combination of wakeup and skipping of wakeup at paging slots. The skipping of wakeup will result in an increase in time spent by UE 6 in standby mode, and will have the effect of reducing power demands as compared to when UE 6 is configured to wake up for every paging slot 20. The conditions under which paging slots can be skipped, and the number of paging slots to be skipped, may, for example, all be configured at an operator or other level.

In best case conditions, during quiet network periods and/or when UE 6 is relatively stationary (i.e. when UE 6 does not move around within or between cells) with good reception conditions, power consumption may be significantly reduced, although there may be some increase in the paging delay due to the skipped paging slots. When reception conditions are relatively good, which may be the case, for example, for many hours during non-peak times and/or in rural areas, the standby power consumption may still be significantly reduced, while giving a small and bounded average and peak paging delay. However, in poor or marginal reception conditions and/or when the paging channel is highly active, little or no benefit may be realized from skipping slots 20. Accordingly, there may be little or no change in power performance or in paging delay under such conditions.

Due to the skipped paging slots and the resultant skipping of at least some of the paging indication signals, paging indication processor 14 may change its measurement scenario for performing measurements on neighboring cells, one of its main functions. The network may typically set a requirement for an average rate of measurements on signals from neighboring cells, which may not be possible to achieve when skipping slots for receiving paging indication signals. Accordingly, when paging slots are to be skipped, conditional wakeup mechanism 10 may indicate to paging indication processor 14 that it needs to increase the number of measurements performed on signals transmitted by neighboring cells, thereby to maintain a required average rate of neighbor cell measurements. It is noted that, in some user equipment, the functionality for measuring neighboring cells may not be included in paging indication processor 14, but rather may be provided either separately or as part of a bundle of functionality offered by a different utility.

Figure 3:
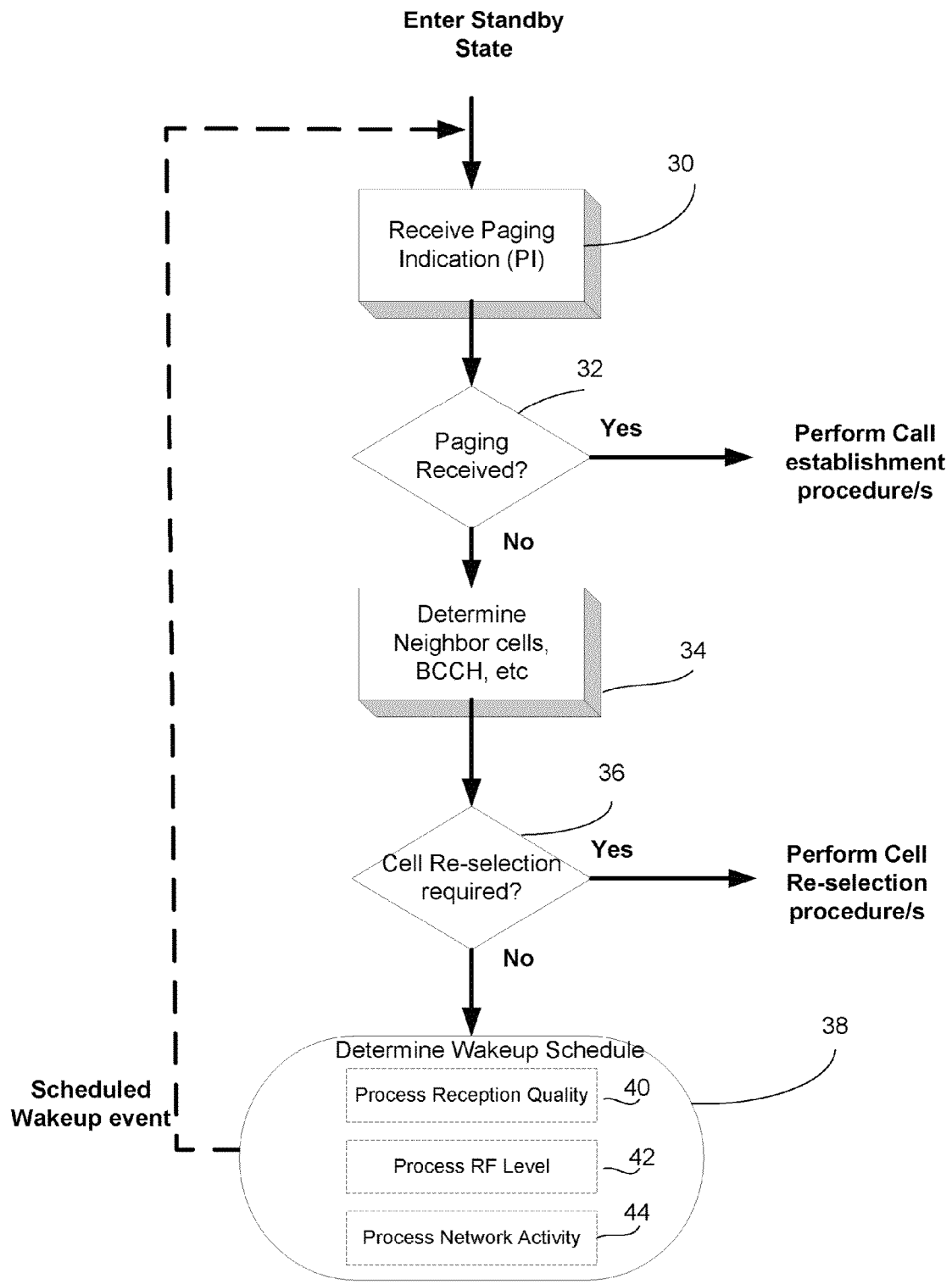
FIG. 3 is a flow chart illustrating operation of the user equipment of FIG. 1, constructed and operative in accordance with an embodiment.

Reference is now made to FIG. 3, which illustrates, in flow chart format, operation of paging indication processor 14 and conditional wakeup mechanism 10. In step 30, paging indication processor 14 may receive and decode paging indication signals that are transmitted on a network. Processor 14 may determine whether one of the paging indication signals is intended for the current UE. At block 32, if yes, UE 6 may perform call establishment procedures.

It is noted that any and all signals received by UE 6 may be processed in step 30. For example, in accordance with some cellular communication standards, paging indication signals and reference symbols may be transmitted on a control channel. Accordingly, determination of reception quality may not be based solely on the received paging indication signal. Paging indication signals may not be sent at every slot, but only when the network indicates that a given UE 6 should wake up and receive a call. Step 30 may also include the receipt by processor 14 (and/or any other suitable functionalities installed on UE 6) of other signals that may be indicative of reception quality.

If, at block 32, a determination is made that none of the received paging signals are intended to wakeup the present UE 6, processor 14 may then typically determine (step 34) neighbor cell information, such as, for example, BCCH and RSSI (RXLEV) measurements, as well as reselection criteria, access parameters, and any other information that may be gleaned from the paging indicating signal and other signals that UE 6 receives while awake.

Based on the result from step 34, at step 36, a determination may be made as to whether the cell needs to be changed. If the cell needs to be changed, then UE 6 may perform cell reselection procedures.

If cell reselection is not required, flow continues to step 38, where conditional wakeup mechanism 10 may evaluate the prevailing conditions to determine the schedule for the next wakeup time. Reception quality, as received from reception quality determiner 12, may be processed (step 40) to check for high reception quality conditions. High reception quality may, for example, be defined as a block error rate (BLER) of less than 1%.

RF (radio frequency) level, as received from reception quality determiner 12, may also be processed (step 42) to check for a condition of good RF. For example, a threshold for good RF may be defined as −85 dBm.

Other measures of reception quality may be utilized. Each type of cellular network may have its own measures of reception quality, depending on the way signals are transmitted. The reception quality measures may be set accordingly.

Network activity, as received from system message handler 16, may also be processed (step 44) to check for a condition of low activity. For example, a threshold for low network activity may be defined as one paging message every three minutes. It is noted that network activity may include activity by other UEs 6 in the same area. Accordingly, the paging signals tracked in order to determine network activity may include signals that are directed to other UEs 6 as well.

Conditional wakeup mechanism 10 may then determine how many, if any, paging slots 20 to skip before the next wakeup time for UE 6. In accordance with an embodiment, if any of the conditions are met in steps 40, 42 and 44, the next paging 20 may be skipped. If no favorable conditions have been detected (i.e. reception quality is not sufficiently high, RF level is not sufficiently good and/or network activity is not sufficiently low), then conditional wakeup mechanism 10 may schedule the next wakeup time for the next paging slot 20. It is noted that the determination formula presented hereinabove is merely illustrative; any suitable algorithm based on the conditions as input to conditional wakeup mechanism 10 may be used to determine the number of paging slots 20 to be skipped, if any.

It is also noted that the definitions for favorable conditions may be implemented as configurable settings which may be changed, for example, according to the technology in the associated mobile network.

Unless specifically stated otherwise, as apparent from the preceding discussions, it is noted that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise general-purpose computer hardware selectively activated or reconfigured by a computer program stored in memories associated with the computer. Such a computer program may be stored in a computer readable storage medium. In addition, embodiments of the present invention are not described with reference to any particular programming language. It is noted that a variety of programming languages may be used to implement the teachings of the invention as described herein.

While certain features of embodiments of the invention have been illustrated and described herein, many modifications, substitutions, changes, and equivalents will be apparent to those of ordinary skill in the art. It is, therefore, to be noted that the appended claims are intended to cover all such modifications and changes.

What is claimed is:

1. A method for waking up user equipment in a cellular network, comprising:
   waking up a receiver module at a predetermined wakeup time to receive a transmitted paging signal;
   when awake, determining (i) a reception quality of the paging signal and (ii) a time interval between successive paging signals transmitted by a network component; and
   skipping at least a next possible wakeup time in response to (i) the reception quality of the paging signal exceeding a reception quality threshold level and (ii) the time interval being smaller than an interval length threshold value;
   wherein said skipping comprises skipping more than one wakeup time.

2. The method according to claim 1, further comprising:
   when awake, determining a network activity level, wherein said skipping at least the next possible wakeup time further comprises skipping at least the next possible wakeup time in response to the determined network activity level exceeding a network activity threshold level.

3. The method according to claim 2, wherein determining said network activity level comprises determining a level of paging activity.

4. The method according to claim 1, further comprising performing, while awake, at least some neighbor cell measurements that were to be performed during a skipped wakeup time period so as to maintain a target number of neighbor cell measurements.

5. The method according to claim 1, wherein a measure of the reception quality of the paging signal comprises one of a bit error rate (BER), a block error rate (BLER), a received signal strength indicator (RSSI) and a reference signal received power (RSRP).

6. The method according to claim 1, further comprising performing, while awake, at least some neighbor cell measurements that were to be performed during a skipped wakeup time period so as to maintain a target number of neighbor cell measurements.

7. A user equipment for use on a mobile communications network, the user equipment comprising:
   a reception quality determiner to determine at least one of a reception quality of a signal received from a network and a radio frequency (RF) level of said signal;
   a paging indication processor to process received paging signals;
   a system message handler to determine a level of activity for a cellular network, wherein the determined level of activity for the cellular network is based on a frequency with which paging signals are transmitted by a network component; and
   a conditional wakeup mechanism configured to set a next wakeup time for the user equipment responsively to inputs from the reception quality determiner and the system message handler;

wherein said conditional wakeup mechanism is configured to cause the UE to periodically skip waking up for at least one possible wakeup time.

8. The user equipment according to claim 7, wherein said system message handler comprises a paging activity determiner to determine a level of paging activity.

9. The user equipment according to claim 7, and wherein said paging indication processor also comprises a neighbor cell measurer to make neighbor cell measurements and to maintain an average number of said neighbor cell measurements when skipping possible wakeup times.

10. A method for waking up user equipment in a cellular network, comprising: waking up a receiver module at a predetermined wakeup time to receive a transmitted paging signal;

when awake, determining a time interval between successive paging signals transmitted by a network component; and skipping at least a next possible wakeup time in response to the time interval being smaller than an interval length threshold value;

wherein said skipping comprises skipping more than one wakeup time.

* * * * *